United States Patent
Pell et al.

(10) Patent No.: US 7,685,116 B2
(45) Date of Patent: Mar. 23, 2010

(54) TRANSPARENT SEARCH QUERY PROCESSING

(75) Inventors: Mike Pell, Woodinville, WA (US); Evgeny Ivanovich Tvorun, Sammamish, WA (US); David Dawson, Seattle, WA (US); Aaron Paul Starkey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 11/693,483

(22) Filed: Mar. 29, 2007

(65) Prior Publication Data

US 2007/0174350 A1    Jul. 26, 2007

Related U.S. Application Data

(63) Continuation-in-part of application No. 11/011,811, filed on Dec. 14, 2004.

(51) Int. Cl.
    *G06F 17/30* (2006.01)
(52) U.S. Cl. ................. 707/4; 707/5; 707/102; 707/104.1
(58) Field of Classification Search ............. 707/1–6, 707/100–102, 104.1; 704/9
    See application file for complete search history.

(56) References Cited

U.S. PATENT DOCUMENTS

| | | | |
|---|---|---|---|
| 5,404,506 | A | 4/1995 | Fujisawa et al. |
| 6,665,640 | B1 * | 12/2003 | Bennett et al. ............. 704/257 |
| 6,954,750 | B2 | 10/2005 | Bradford |
| 6,999,932 | B1 * | 2/2006 | Zhou ........................ 704/277 |
| 7,027,975 | B1 * | 4/2006 | Pazandak et al. ............ 704/9 |
| 7,100,123 | B1 | 8/2006 | Todd et al. |
| 7,209,876 | B2 * | 4/2007 | Miller et al. ................ 704/9 |
| 7,310,642 | B2 * | 12/2007 | McConnell et al. .......... 707/6 |
| 2003/0130835 | A1 | 7/2003 | Azzam et al. |
| 2003/0176999 | A1 | 9/2003 | Calcagno et al. |
| 2004/0088282 | A1 | 5/2004 | Xu et al. |
| 2004/0148170 | A1 * | 7/2004 | Acero et al. ............... 704/257 |

(Continued)

FOREIGN PATENT DOCUMENTS

EP    0287310 A2    10/1988

OTHER PUBLICATIONS

"AutoFocus: Semantic Search for the Desktop", http://ieeexplore.ieee.org/iel5/10086/32319/01509119.pdf?isNumber=.

(Continued)

*Primary Examiner*—Debbie Le
(74) *Attorney, Agent, or Firm*—Shook, Hardy & Bacon, L.L.P.

(57) ABSTRACT

A method and system for transparently processing a search query by displaying a search query interpretation or restatement inside a search box. Upon receiving a natural language input from a user, the method converts the natural language input to a search query interpretation of the natural language input. Then, the method displays the search query interpretation to the user inside a search box, executes a search based on the search query interpretation and displays a search result to the user. The system includes a user interface to receive a search query input from a user, a restatement engine to convert the search query input into a search query interpretation, a search box to display the search query interpretation to the user, and an execution engine to execute a search based on the search query interpretation and provide a search result for display to the user.

12 Claims, 13 Drawing Sheets

U.S. PATENT DOCUMENTS

| | | |
|---|---|---|
| 2006/0010117 A1 | 1/2006 | Bonabeau et al. |
| 2006/0047502 A1 | 3/2006 | Ramsey et al. |
| 2006/0047632 A1 | 3/2006 | Zhang et al. |
| 2006/0053096 A1* | 3/2006 | Subramanian et al. ......... 707/3 |
| 2006/0075120 A1 | 4/2006 | Smit et al. |
| 2006/0129379 A1 | 6/2006 | Ramsey et al. |
| 2006/0129536 A1* | 6/2006 | Foulger et al. ................. 707/3 |
| 2006/0195435 A1 | 8/2006 | Laird-McConnell et al. |
| 2006/0200827 A1 | 9/2006 | Sidlosky et al. |

OTHER PUBLICATIONS

"Google Desktop Features", http://desktop.google.com/features.html.

"Windows Desktop Search: Best in Class Search Tool", http://www.microsoft.com/windows/desktopsearch/search/default.mspx.

"Activity Based Metadata for Semantic Desktop Search", http://www.kbs.uni-hannover.de/Arbeiten/Publikationen/2004/DesktopSearch.pdf.

* cited by examiner

TRANSPARENT SEARCH QUERY PROCESSING

CROSS-REFERENCE TO RELATED APPLICATIONS

This application is a continuation-in-part of prior application Ser. No. 11/011,811 filed Dec. 14, 2004, which is hereby incorporated by reference.

STATEMENT REGARDING FEDERALLY SPONSORED RESEARCH OR DEVELOPMENT

Not applicable.

BACKGROUND

Given the vast amount of digital information available today, computer users are increasingly utilizing search techniques to locate specific information and documents. It is now common for individual websites and application programs to provide a search box so that users can run queries for content on that web site or within that application. Similarly, desktop search techniques allow a user to search for information and documents stored on his or her computer.

An effective search engine is particularly useful when searching a large collection of information, such as the Internet or the World Wide Web. Search engine providers typically present users with an input box for typing in a search query. After the user has typed in his or her query, the search engine processes the query and displays search results to the user that correspond to the search engine's interpretation or restatement of the user's query. However, the search engine typically does not display its interpretation of the search query to the user. Consequently, a user dissatisfied with the search results may submit a different query that is informed by the displayed results from the prior search but without the benefit of the search engine's interpretation of the user's original query. Some search engines offer an "advanced search" option for those users who want to build a more complex search query. However, these advanced search options typically either require the user to be familiar with an advanced query syntax or require the user to fill out a form including a number of checkboxes, dropdown menus and/or fields.

Despite significant advances in search technology, many users still do not understand why correct search results are not returned whenever they type keywords into a search box. If the search query interpretation of the user's search query is not displayed to the user, then the user must resort to trial-and-error to improve the quality of the search results. Even where the search query interpretation is surfaced to the user, that interpretation is typically displayed in a piecemeal fashion utilizing multiple checkboxes, dropdown menus and/or fields. Such excessive use of screen real estate is confusing to users and disfavored by applications, such as media players, that provide a search box but are primarily used for another purpose.

Graphical user interface (GUI) applications perform well in most tasks, in part, because the GUI provides options which relate directly to functionality available within an application and from which the user may select what he/she wants to do. However, GUI applications can sometimes be difficult to use. For example, in some instances, the functionality requires opening many sub-dialog boxes, which may not be intuitive for a user. Additionally, many steps may be required to fill in the GUI elements with the proper information. GUI elements may include pull down or pop up menus, check boxes, radio buttons, text or other types of data input fields, and so on. Moreover, the user may not know where to find available options within the GUI. With small devices (such as hand-held devices, personal digital assistants, wireless phones with networking capabilities, and so on), entry of the information into the GUI may be difficult. Finally, handicapped individuals may have difficulty navigating and completing a GUI form, for example.

To overcome some of the limitations associated with GUIs, natural language (NL) applications have been developed, which can allow a user to easily express concepts that would be fairly complex in a GUI. For example, in natural language, a user may request "Find all emails to Bill that I sent last week", "Change the screen resolution to 1280.times.1024", "where is the web page about Microsoft Corporation", "Please delete all unread emails", and so on. Each such utterance is readily understandable, but may add multiple layers of complexity in completing a GUI form.

However, there are some problems with NL applications, such as discoverability, confusion, dead-end, and training problems. Discoverability refers to situations where the user is unaware of what he/she can do in the program. Confusion refers to problems that arise when users do not understand how the application interpreted a particular text input. A dead-end refers to a situation where the software program provides no option or mechanism for the user to alter what he/she intended. Finally, there is no mechanism to train the user how to utilize NL input.

SUMMARY

Embodiments of the present invention solve at least the above problems by providing a system, method and media for, among other things, transparently processing a search query by displaying a search query interpretation or restatement inside a search box. These embodiments utilize a simple, natural syntax that is intuitive for users and make efficient use of screen real estate. By displaying the search query interpretation inside the search box and allowing for inline user interaction with the interpretation, query processing becomes transparent to the user and facilitates user training and education.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Embodiments of the present invention provide a system, method and media for, among other things, transparently processing a search query using a simple, natural syntax that is intuitive for users. Some of these embodiments make efficient use of screen real estate by displaying a search query interpretation or restatement inside a search box. These embodiments also allow for inline user interaction with the interpretation. As a result, query processing becomes transparent to the user and facilitates user training and education.

Figure 1:
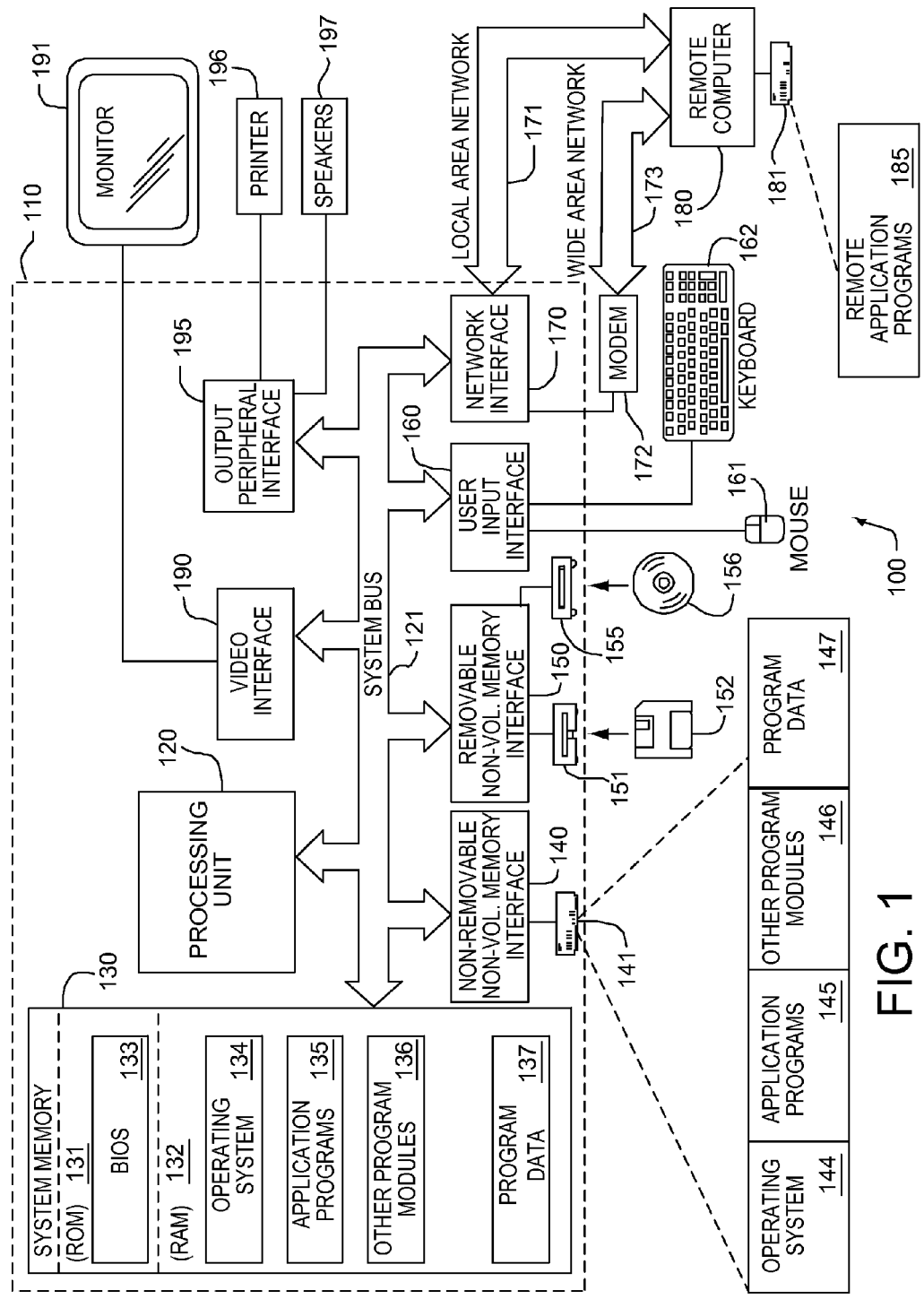
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disc storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
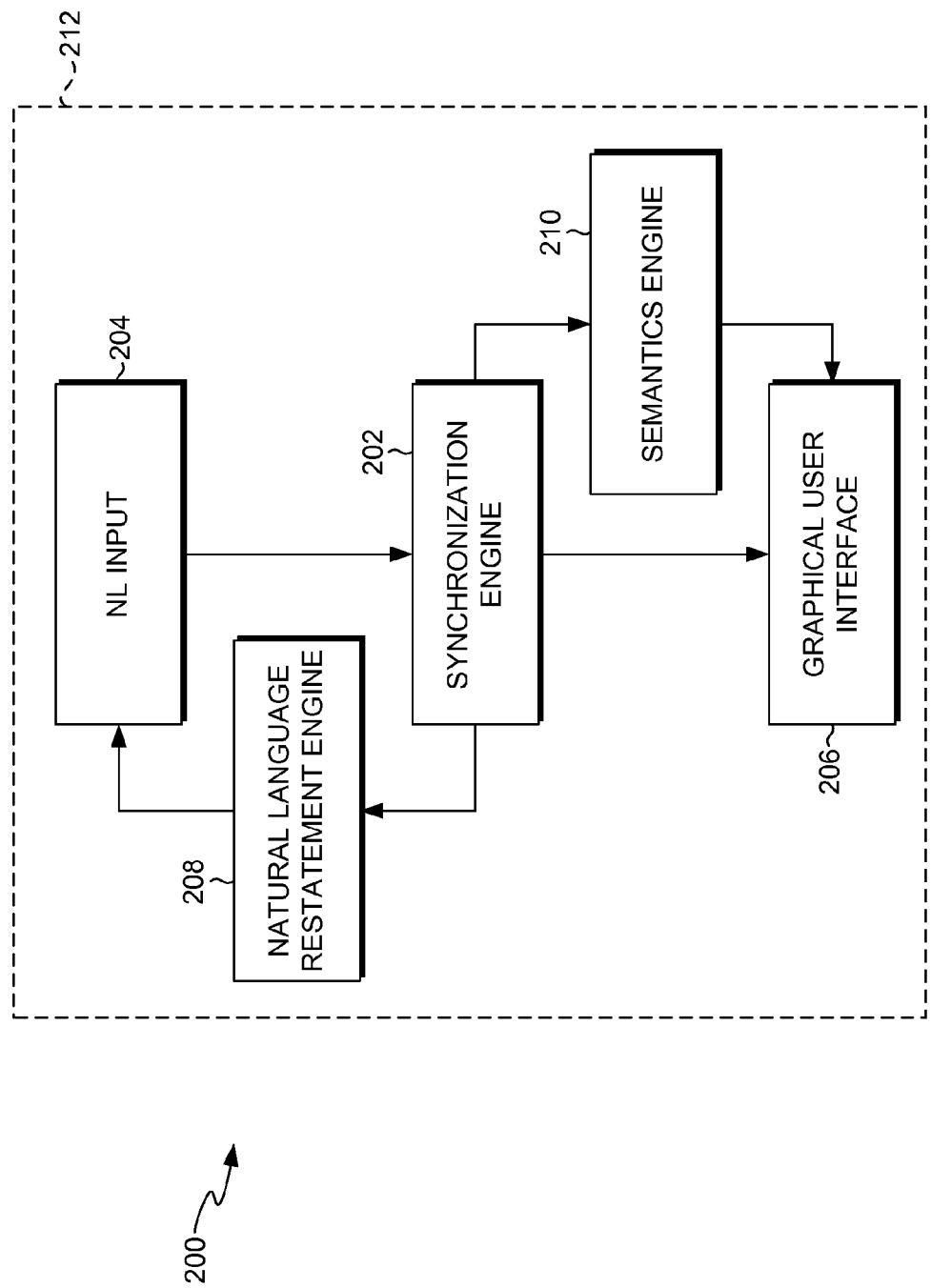
FIG. 2 is a simplified block diagram of a system for synchronizing natural language and GUI inputs according to an embodiment of the present invention.

FIG. 2 is a simplified block diagram of a synchronization (semantic canvas) system 200 according to an embodiment of the present invention. The synchronization system 200 has a synchronization engine 202 communicatively coupled between a natural language (NL) input element 204 and a graphical user interface (GUI) 206. Generally, the NL input element 204 is an element adapted to receive a text string or speech input. The NL input element 204 allows the user to type, paste or enter data (such as by speaking) in complete or partial sentences and intents, such as "find all emails that I sent to Joe last week". The NL input element 204 can be any mechanism for accepting such user input. The NL input element 204 can include a speech-to-text function (not shown) and can be adapted to receive speech input and to digitize such input into text. The GUI 206 is comprised of one or more functional elements (such as pull down menus, text fields, check boxes, fields within an application domain, and so on). The GUI 206 allows the user to explicitly build his or her intent from objects within the GUI. For example, for the intention of finding all emails sent to Joe from Bill last week, the user can utilize the GUI 206 to select "email" under items to find. The user can then use the GUI 206 to add a condition, such as "sent to" and add "Joe" as the value. Finally, the user can add another condition, such as "date sent" and the like. Generally, the GUI 206 and the NL input element 204 are adapted to perform the same function, such as a find function. A user can find an object or an entity on, for example, a computer hard disk either by selecting one or more functional elements of the GUI 206 and entering appropriate condition information or by entering a query in the NL input element 204.

The synchronization engine 202 is a module adapted to respond to changes in the NL input line 204 and to update the GUI 206 accordingly. The synchronization engine 202 is also adapted to respond to changes in the GUI and to update the NL input line to reflect what the user typed. The synchronization engine 202 utilizes an NL restatement engine 208 to translate selected functional elements of the GUI 206 to natural language text input in the NL input element 204. The synchronization element 202 utilizes a semantics engine 210 to convert natural language input from the NL input element 204 to functional elements in the GUI 206. The synchronization engine 202 is adapted to monitor for changes to the data in the NL input element 204 or changes to selected functional elements of the GUI 206 and to update the other with the appropriate changes, such that the NL input element 204 and the GUI 206 are synchronized.

The functional elements of the semantic canvas system 200 can be implemented within a single application (as indicated by dashed line 212). Alternatively, functional elements of the semantic canvas system 200 can be implemented in more than one application and adapted to communicate to provide the synchronization.

In general, the NL input to the NL input element 204 can be in any cognizable form. In one embodiment, the NL input element 204 is adapted to receive text or speech input. As used herein, the term "NL input" refers to any data input in a natural language format. As used herein, the term "natural language" refers to input that parallels the way that a person normally speaks, as opposed to computer languages, artificial languages, or constrained or controlled vocabularies. As used herein, the terms "text input", "NL input" and "speech input" can be understood to be interchangeable with respect to inputs to the NL input element 204.

Figure 3:
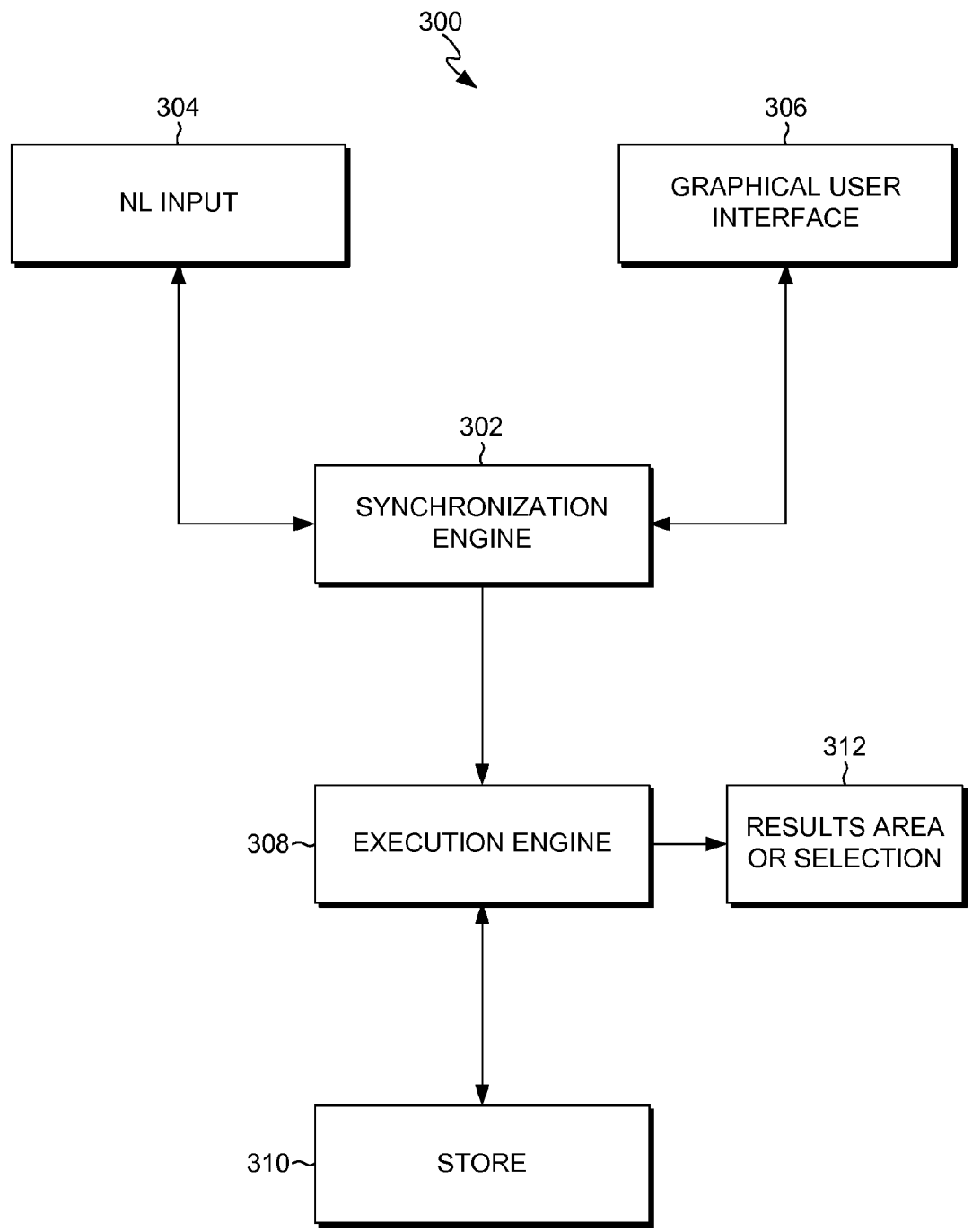
FIG. 3 is an expanded simplified block diagram of a portion of a system for synchronizing natural language and GUI inputs according to an embodiment of the present invention.

FIG. 3 is an expanded block diagram of a portion of a synchronization system 300 according to an embodiment of the present invention. In this implementation, the underlying semantics of the synchronization engine are converted to a query syntax, such as SQL, hitting a database, and returning the results. However, it is possible for the application to perform the tasks or searches any number of ways, either directly from the GUI, from the NL input, or from some intermediate representation.

The synchronization system 300 has a synchronization engine 302 that is communicatively coupled between an NL input 304 and a GUI 306. Additionally, the synchronization engine 302 is communicatively coupled to an execution engine 308 and a data store 310. The execution engine 308 performs an operation on the data in the data store 310 based on the text input of the NL input 304 or functional element selection of the GUI 306, and returns the results to a results area 312 of the user interface.

The NL input 304 allows a user to type in his/her intention (such as "Find all email from Bob"). The NL input 304 notifies the synchronization engine 302 when changes occur. The GUI 306 allows the user to manually build and alter his/her intention from functional elements, such as pull down menus and the like. The GUI 306 notifies the synchronization engine 302 when changes occur. The synchronization engine 302 is adapted to automatically build the functional elements in the GUI 306 when the user enters text in the NL input 304. The synchronization engine 302 is also adapted to automatically update the text in the NL input 304 in response to changes in the GUI 306. In either case, the synchronization engine 302 notifies the respective element (NL Input 304 or GUI 306) of the changes.

Thus, the synchronization engine 302 leverages the strengths of the GUI 306 and the NL input 304, while overcoming limitations of both. Between the NL input 304 and the GUI 306, the synchronization system 300 implemented in a user interface provides mechanisms to easily allow the user to express what he or she wants to do, to show what he/she could have done in either the GUI 306 or the NL input 304, and to alter the expression in either place. The system 300 provides a means for built-in training and discoverability.

In one embodiment, the execution engine 308 is notified of changes by the synchronization engine 302. The execution engine 308 constructs an SQL-like query, for example, and fetches the results from the store 310. The execution engine 308 then passes the results to the results area 312 (or application) for display.

One implementation of this approach converts the underlying semantics in the synchronization engine 302 to a query syntax such as SQL, hitting a database 310, and returning the results to a display area 312.

The synchronization engine can be implemented efficiently using a semantic engine with an authored schema and annotation set. Alternatively, an application can implement all of the logic for translating between NL and the GUI and back.

Figure 4:
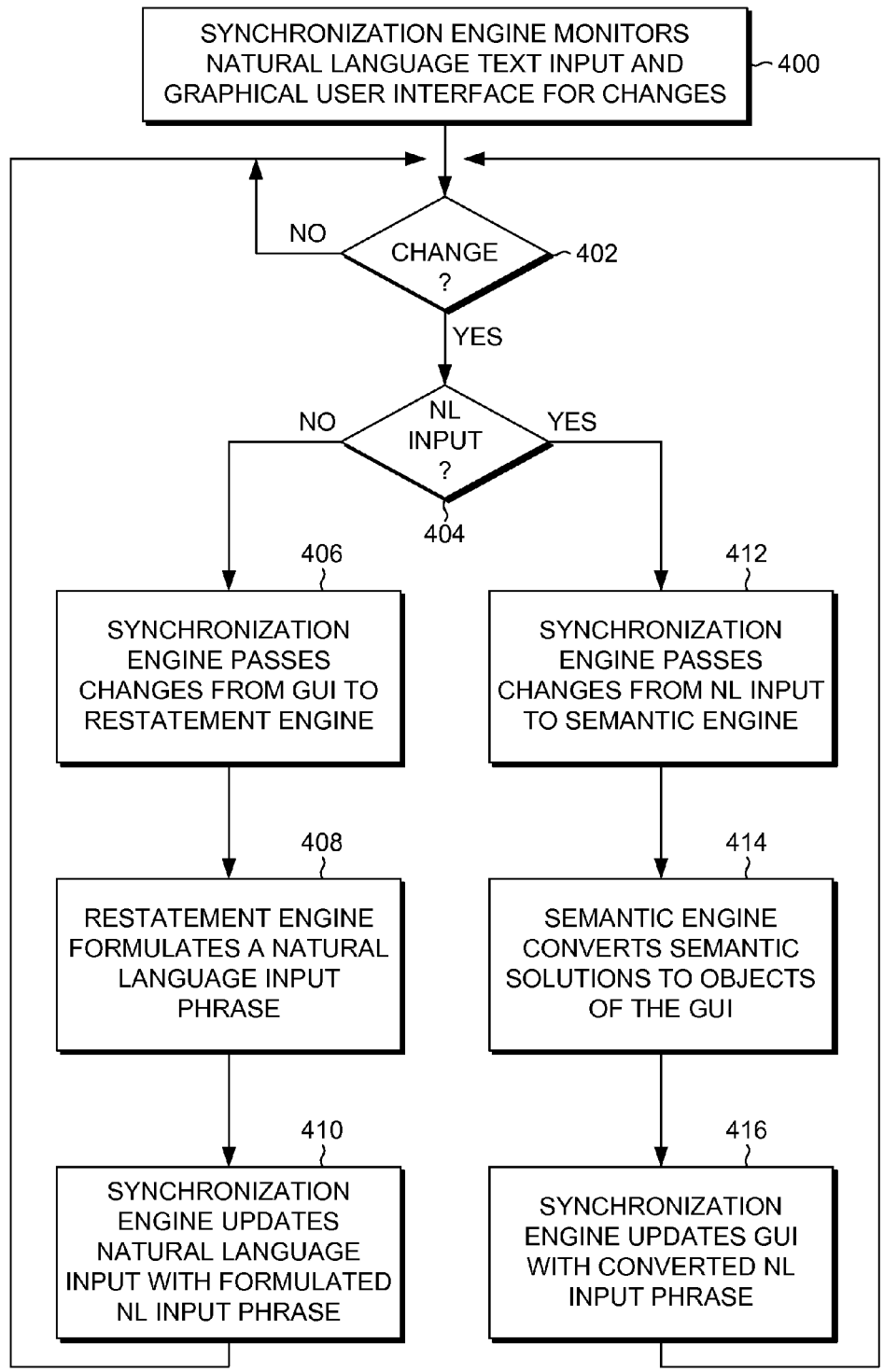
FIG. 4 is a simplified flow diagram illustrating a method of synchronizing the GUI and the natural language input according to an embodiment of the present invention.

FIG. 4 is a simplified block diagram of a method of synchronizing a GUI and a natural language text input of a user interface according to an embodiment of the present invention. The synchronization engine monitors the GUI and the natural language text input for changes (block 400). If there are no changes (block 402), the synchronization engine continues to monitor the GUI and the natural language text input until a change is detected. If a detected change is not to the NL input (block 404), the synchronization engine passes changes from the GUI to a restatement engine (block 406). The restatement engine formulates a NL input phrase (block 408). The synchronization engine then updates the natural language input with the formulated NL input phrase (block 410). The synchronization engine then continues to monitor the NL input and the GUI for changes (block 400).

If a detected change is to the NL input (block 404), the synchronization engine passes changes from the NL input to the semantic engine (block 412). The semantic engine converts semantic solutions to objects of the GUI (block 414). The synchronization engine updates the GUI with the converted NL input phrase (block 416). The synchronization engine then continues to monitor the NL input and the GUI for changes (block 400).

Figure 5:
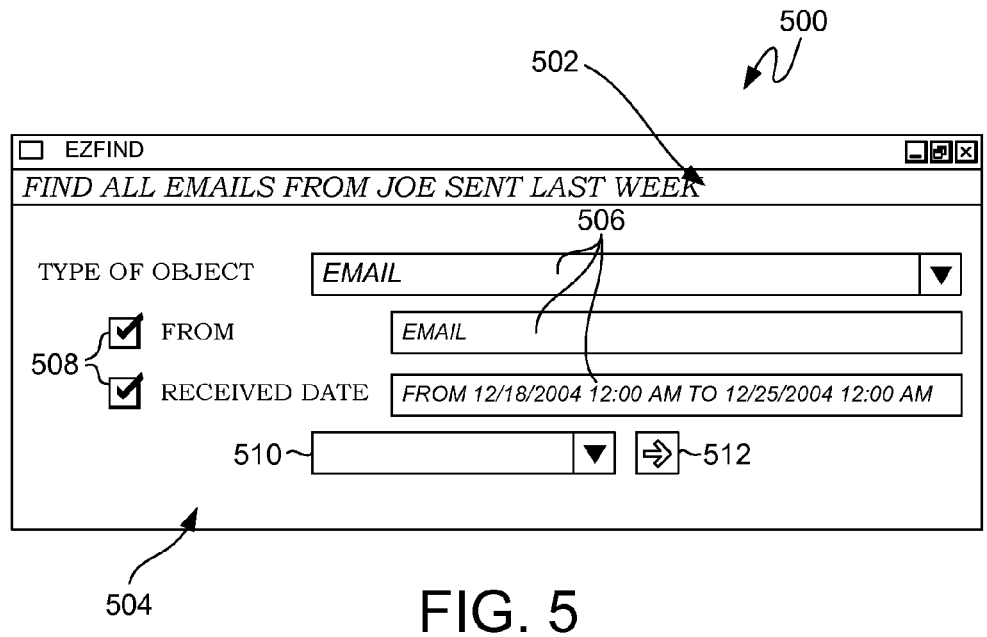
FIG. 5 is a screen depiction of a Find application with natural language input and GUI input elements, where some of the GUI elements have been automatically constructed from the natural language input according to an embodiment of the present invention.

FIG. 5 is a screen depiction of a Find application 500 with natural language input element 502 and GUI 504 with input elements or GUI objects, such as pull-down menus 506, text fields 508, check boxes 510, and buttons 512. Some of the GUI objects (506-512) have been automatically constructed from the natural language input to the natural language input element 502 according to an embodiment of the present invention. In this instance, the user has typed "find all emails from Joe sent last week" in the NL input 502, and the synchronization engine updated the GUI with a plurality of GUI objects 506-512 reflecting what the user typed. The synchronization engine (in conjunction with a semantic engine) set the type of object to "email". Additionally, the synchronization engine built two conditions: "from" is set to "Joe" and "received date" is set equal to the correct date range. Thus, the synchronization engine allows the user to see exactly how the NL input was processed and how the application interpreted the input.

Figure 6:
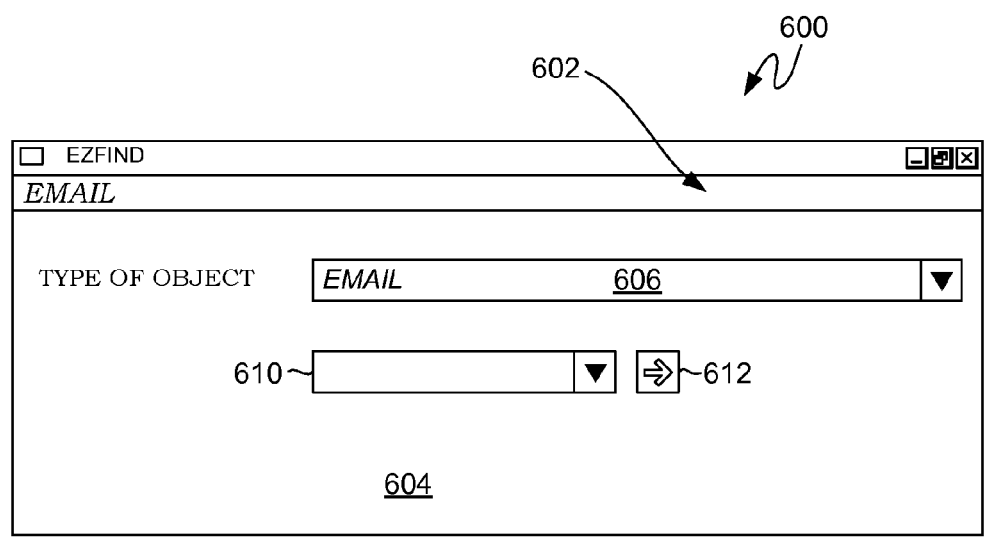
FIG. 6 is a screen depiction of a Find application with natural language input and GUI input elements, where the input line has been updated based on a selected GUI element, according to an embodiment of the present invention.
Figure 7:
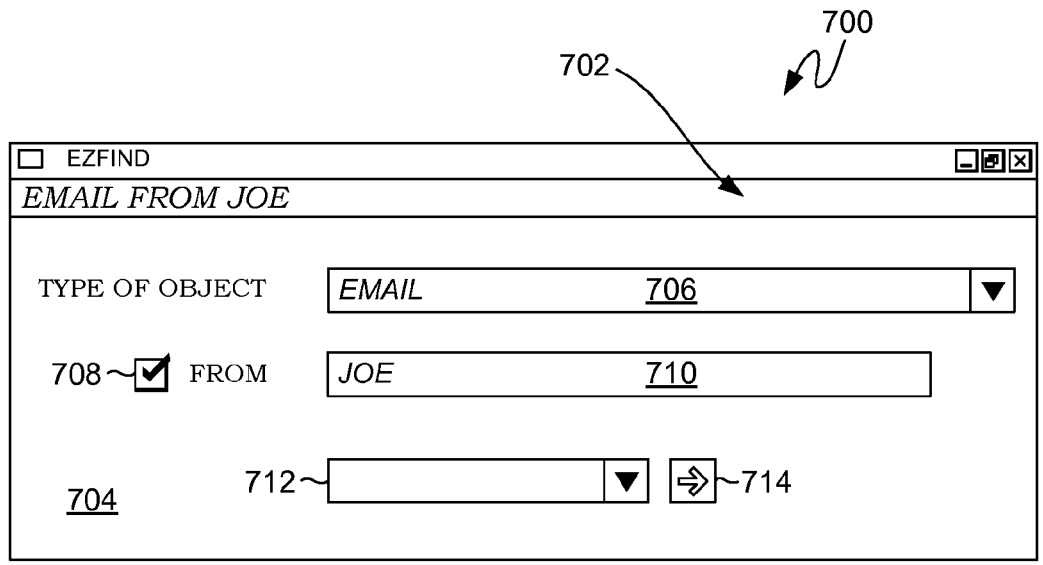
FIG. 7 is a screen depiction of the Find application of FIG. 6 after a "From" condition is added via a selected GUI element according to an embodiment of the present invention.
Figure 8:
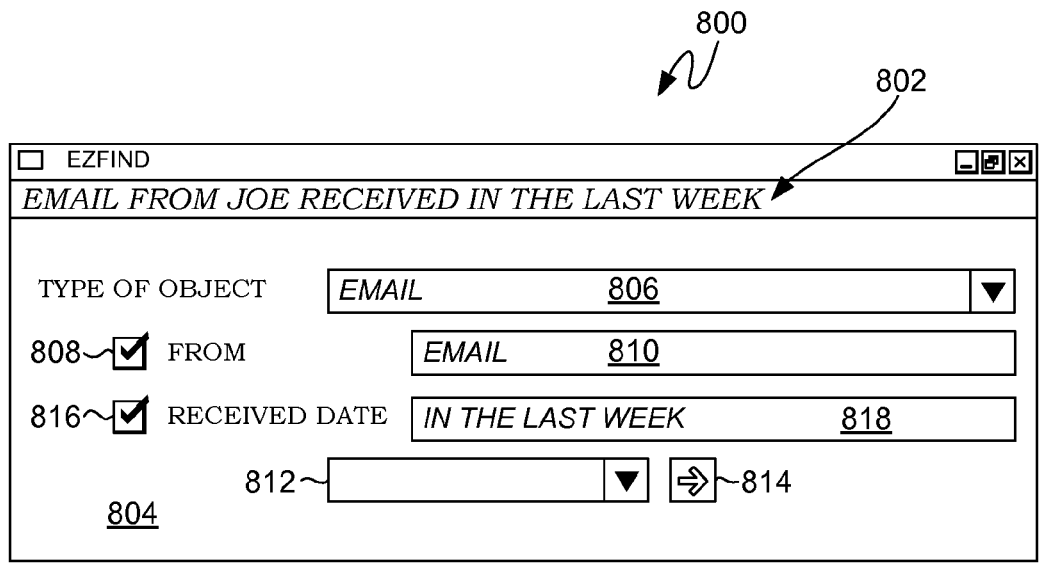
FIG. 8 is a screen depiction of the Find application of FIG. 7 after date condition is added via a selected GUI element according to an embodiment of the present invention.

FIGS. 6-8 depict an alternative approach where the user's intent is built using only the GUI, and the synchronization composes the NL input to correspond to the GUI. In FIG. 6, a Find application 600 includes an NL input field 602 and a GUI 604. The user selects "email" from a pull-down list 606. After selecting "email", the synchronization engine automatically updates the NL input field 602 with the term "email", since the user could have typed "email" to create the same intent. Alternatively, after selecting "email", the user can click a button 612, thereby causing the synchronization engine to update the NL input field 602. Once the user makes a selection, the application 600 adds an additional GUI object 610 (a pull down menu in this instance) for additional user selections.

FIG. 7 is a screen depiction of the Find application of FIG. 6 after a first condition is added. The application 700 includes a NL input field 702 and a GUI 704. The user selects "email" from a type of object pull-down list 706. Based on the selection, the GUI 704 can display one or more conditional options, such as "To", "From", "Received Date" and the like. Alternatively, the user can select a conditional option or other input element using pull-down menu 712. In this instance, the user selects "from" using the pull-down menu 712, and the application 700 adds checkbox 708 and associated text field 710 to the GUI 704, either automatically or based on the user interaction with button 714. The user inputs the term "Joe" in the text field 710. Consequently, the synchronization engine updates the NL input field 702 with a NL representation of the selected GUI objects, resulting in an NL interpretation of the GUI 704 as "email from Joe".

FIG. 8 is a screen depiction of the Find application of FIG. 7 after a date condition is added. The application 800 includes a NL input field 802 and a GUI 804. The user selects "email" from a type of object pull-down list 806. Based on the selection, the GUI 804 either displays one or more conditional options, such as "To", "From", "Received Date" and the like, or the user selects a conditional option from pull-down menu 812. The application 800 either automatically or based on user interaction with button 814 adds checkbox 808 and associated input field 810 to the GUI 804. In this instance, the user selects a second conditional option using pull-down menu 812, resulting in date checkbox 816 and associated date field 818. The user selects one or more of the options and fills in the associated fields. In an alternative embodiment, associated field 818 may be a pull down menu with various date options such as "yesterday", "last week", "last month", and so on. The synchronization engine updates the NL input field 802 with a natural language interpretation of the selected elements 806 and 808 of the GUI 804, resulting in "email from Joe received in the last week".

It is important to note that there are many ways to express the same concept using natural language. There is inherent ambiguity in any natural language input, which must be resolved with reasonable certainty by the semantic engine, and in this case, the synchronization engine.

Figure 9:
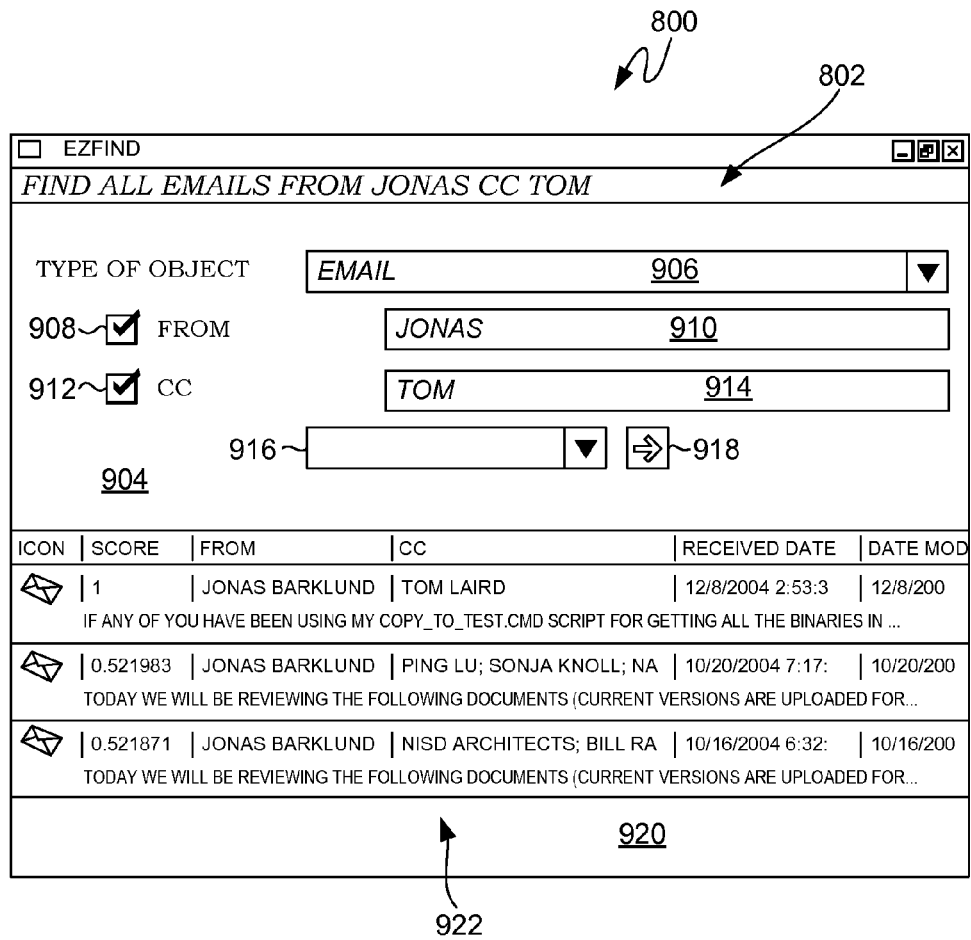
FIG. 9 is a screen depiction illustrating the Find application of FIG. 7 after a "carbon copy" condition is added via a GUI element and after the query is performed according to an embodiment of the present invention.

FIG. 9 is a screen depiction illustrating a different search using the Find application 900 after a "carbon copy" condition is added via a GUI element. The application 900 includes a NL input 902 and a GUI 904. The user selects "email" from a GUI object pull-down list 906. The user can then select one or more conditional options using pull-down menu 916, which provides selection options based on the context. For example, since the user selected "email", the conditional options include application elements associated with email, such as "To", "From", "Received Date" and the like. The user selects one or more of the options (in this instance "From" and "CC" using pull-down menu 916, causing the application to add the selected GUI objects 908 and 912 and their associated input fields 910 and 914, respectively. The user fills in the associated fields 910 and 914. The synchronization engine updates the NL input field 902 with a natural language interpretation of the selected GUI elements 908 and 912 and their associated input fields 910 and 914. In this instance, the application 900 can interact, for example, with an execution engine (such as execution engine 308 in FIG. 3), which executes the search based on the user's input. The execution engine searches a database and returns a list of results for display in a display area 920 of the application 900. The display area 920 can be populated with a list of found items 922. In the case of "find all emails from Jonas CC Tom", the application should show all of the emails that Jonas sent where Tom was copied by "cc". In this instance, there are only three emails that fit these criteria.

While the above discussion has largely focused on a standalone type application, it should be understood that the synchronization feature can be incorporated into a larger application. The synchronization of the GUI objects with natural language input provides the user with insights into how the application interprets natural language. Additionally, the synchronization feature serves as a means for training a user about available options within an application. Finally, the synchronization serves as an error checking feature to allow a user to correct errors in a query, which are made obvious by the application's interpretation of the user selections. This immediate feedback not only renders the application more intuitive for the user, but also allows the user to become more efficient by correcting misinterpretations, of which the user might otherwise be unaware.

FIGS. 10-16 depict embodiments of the invention in which the display of the user input and the display of the search query interpretation of the user input are integrated into a search box. These embodiments make efficient use of screen real estate by displaying the interpretation of the user input inside the search box. Further, these embodiments utilize a simple, natural syntax that is intuitive for users. By displaying the interpretation inside the search box and allowing for inline user interaction with the interpretation, query processing becomes transparent to the user and facilitates user training and education. The integrated search box according to these embodiments may be implemented in a variety of computing environments, including a stand-alone search engine or application, an application program (e.g., a media player), a web page, a web service, and an operating system.

Figure 10:
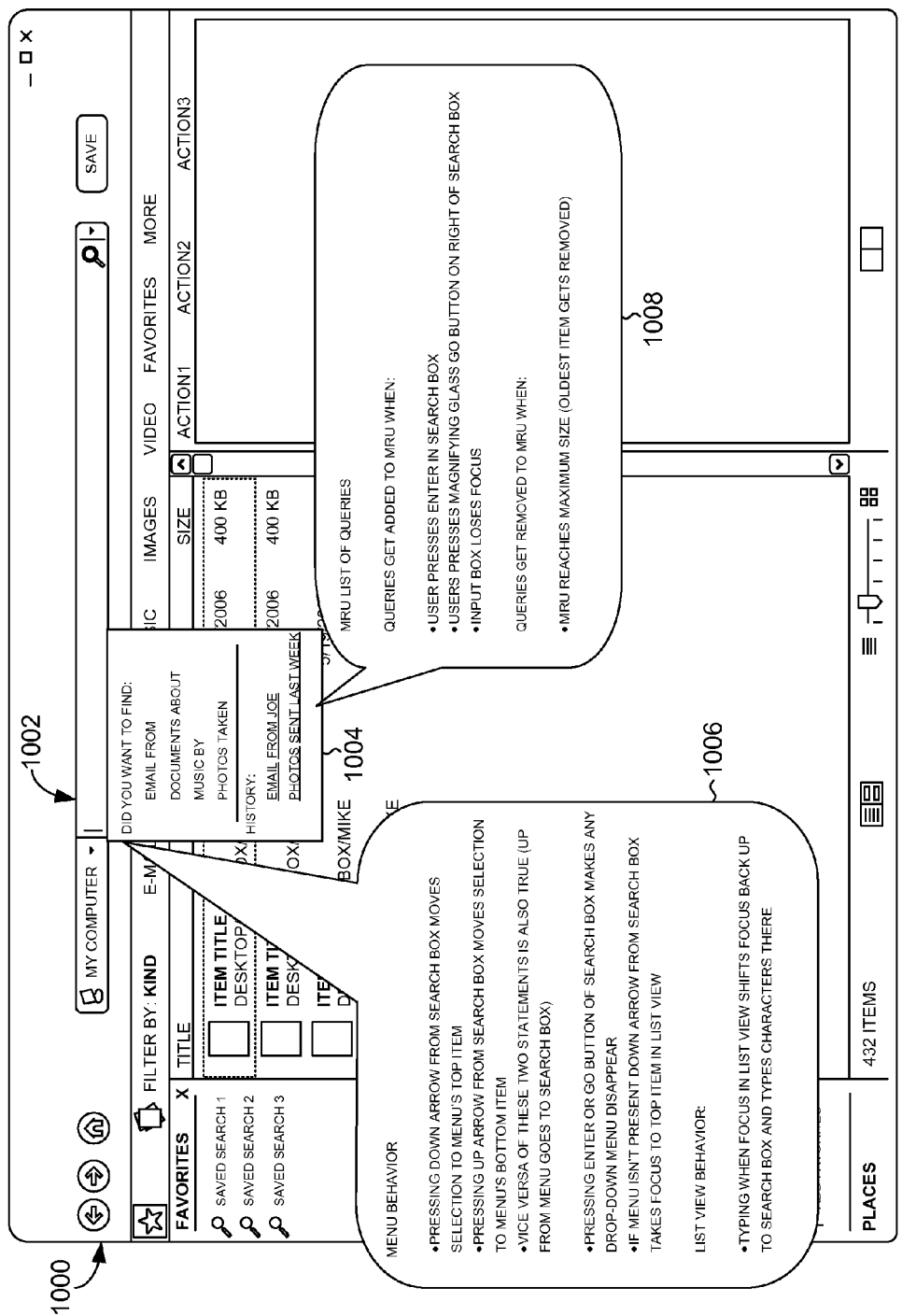
FIG. 10 is a screen depiction illustrating a user typing a query into an empty search box according to an embodiment of the present invention.
Figure 11:
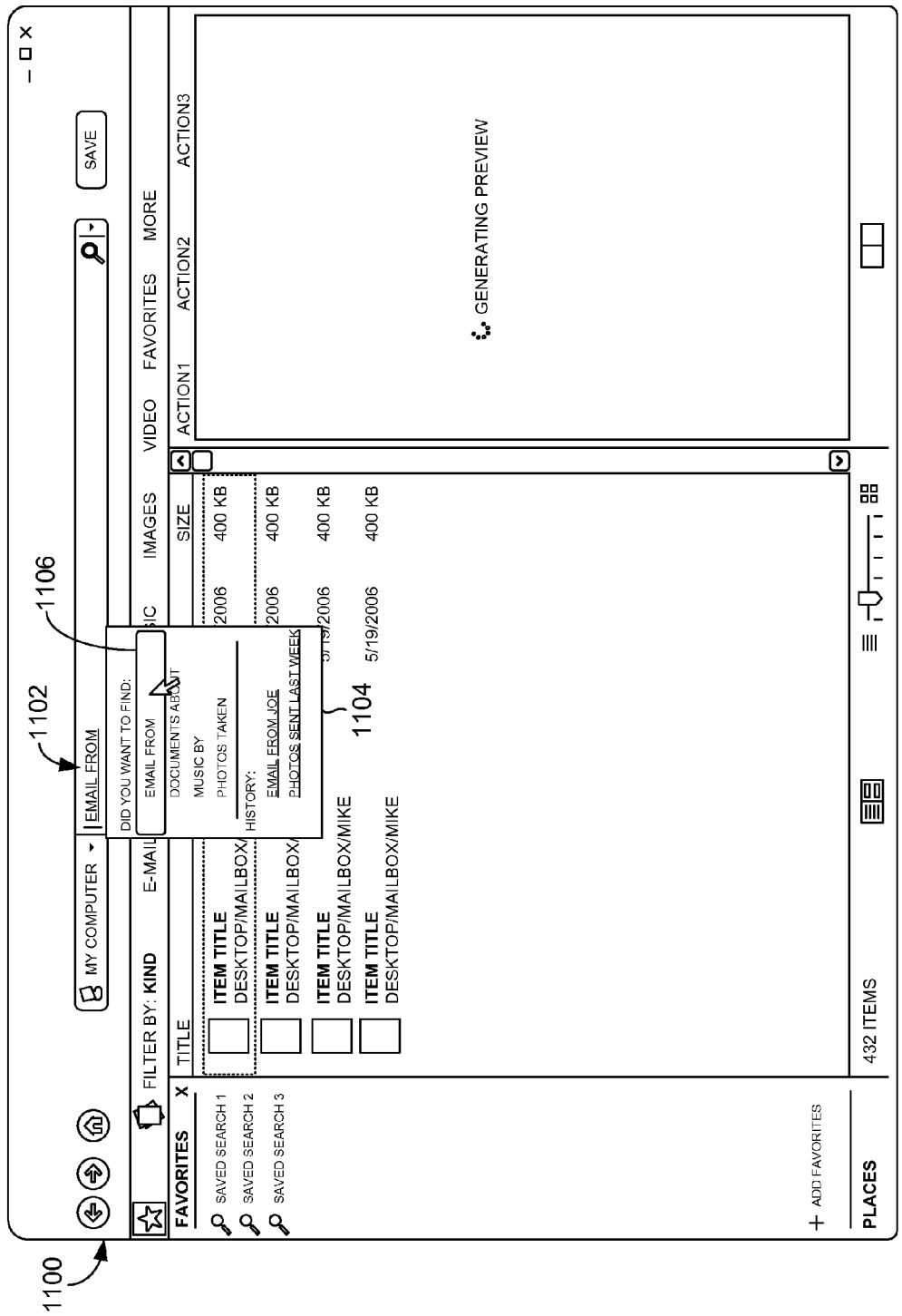
FIG. 11 is a screen depiction illustrating a user building a query into an empty search box according to an embodiment of the present invention.
Figure 12:
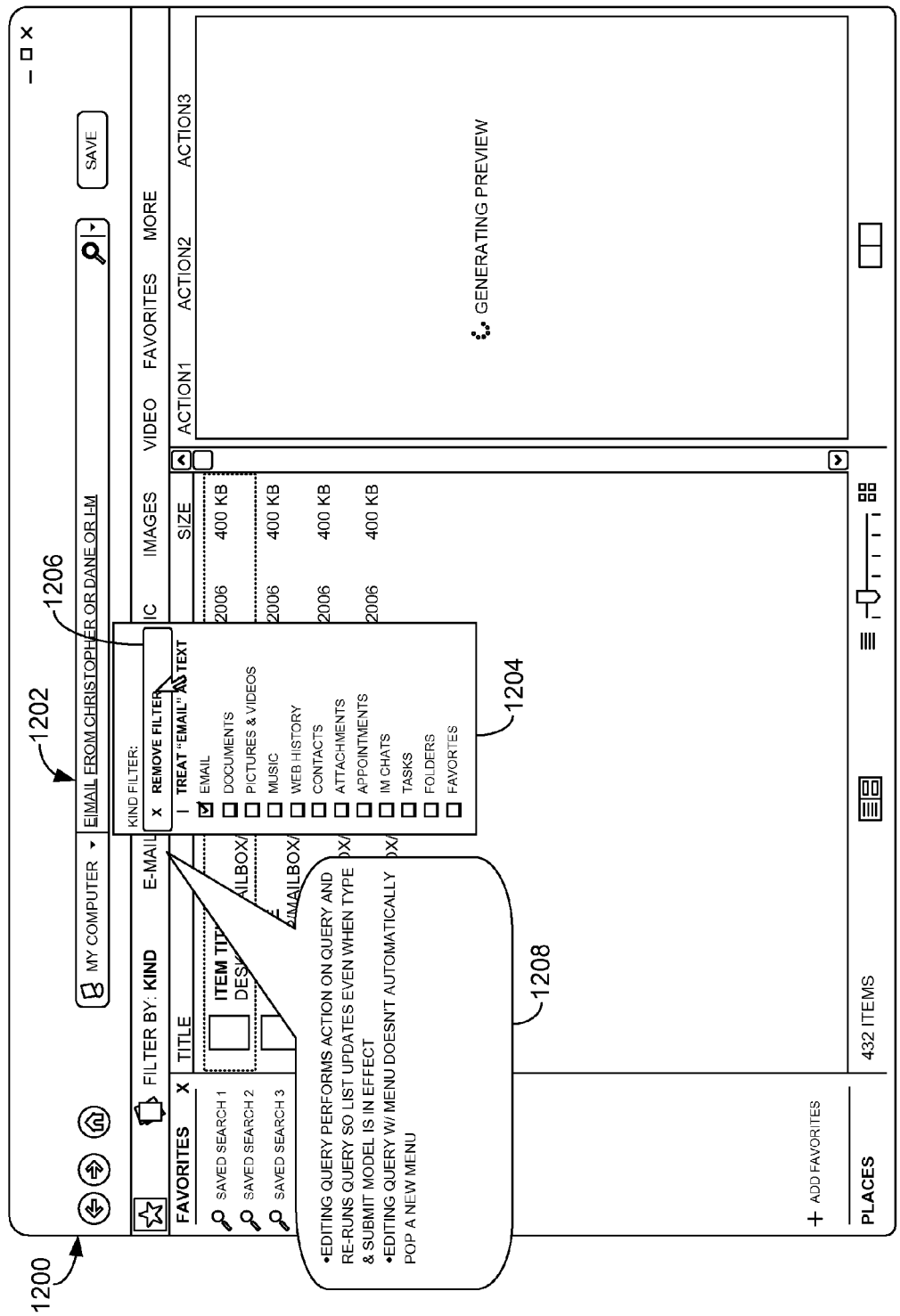
FIG. 12 is a screen depiction illustrating a user editing a search query interpretation displayed in a search box according to an embodiment of the present invention.

Referring initially to FIGS. 10-12, three exemplary scenarios are shown. FIG. 10 is a screen depiction 1000 illustrating one embodiment of a user typing a query into an empty search box 1002. A filter menu 1004 appears in response to user behavior, such as hovering over the search box 1002. In this scenario, the menu 1004 is optional but may be helpful to the user in suggesting search query terms based on general filters (e.g., "Email from") and user-specific filters based on the user's historical search requests. The operation of the filter menu 1004 in this embodiment is further explained in FIG. 10 at 1006 and 1008. The user can populate the search box 1002 in a number of different ways, such as by typing directly into the search box 1002, by selecting one or more items from the menu 1004, by copying and pasting text into the search box 1002, etc.

FIG. 11 is a screen depiction 1100 illustrating one embodiment of a user building a query into an empty search box 1102. A filter menu 1104 provides suggestions to the user based on general filters (e.g., "Email from") and user-specific filters based on the user's historical search requests. As shown in FIG. 11, the top menu item 1106 is selected, which causes the text "Email from" to be displayed in search box 1102 along with indicia that the text "Email from" has a special meaning. In this embodiment, selecting "Email from" in the menu 1104 defaults to a display in the search box indicating that email, as opposed to music or photos, is the "kind" of search object. The term "from" also has special meaning in this embodiment, in that the text that immediately follows "from" should indicate the source of the email. For example, if a user inputs "Dogs from Asia", the word "from" is likely intended as ordinary text specifying that the user is seeking information relating to dogs that come from a place, namely Asia. On the other hand, if a user inputs "Email from Asia", the word "from" is likely not intended as ordinary text. Embodiments of the invention can be configured to always default to words like "from" as ordinary text, to always default to words like "from" as recognized words that have a special meaning, or to selectively default to words like "from" as recognized words under certain conditions (e.g., when preceded by recognized words such as "email"). In any event, these embodiments allow the user to interact with the search query interpretation and correct the interpretation when it is incorrect.

With continued reference to FIG. 11, the significance and/or relationship of the search terms is visually and efficiently presented to the user by displaying indicia in the search box 1102 inline with the search text. For example, underlining recognized words such as "email" and "from" indicate to the user that the words will be interpreted by the search engine as having a special meaning and not as ordinary text to be searched. Moreover, a single, continuous underline below both terms can be used to indicate a relationship between the two terms. As another example, recognized words can be color-coded. As with underlining, relationships between two words can be visually depicted by using the same color for both words. Other forms of indicia may include upper and lower case text, dashed underlining, the use of quotation marks, italics, bold, etc. Those skilled in the art will appreciate numerous other ways in which to visually depict recognized words, relationships and other search query interpretation attributes inside a search box.

FIG. 12 is a screen depiction 1200 illustrating one embodiment of a user editing a search query interpretation displayed in a search box 1202. The interpretation, including both the text and the indicia, could be the result of the user typing natural language text such as "email from Christopher or Dane or I-M" directly into the search box 1202. Alternatively, the user may have used a speech input interface to the search box 1202, built the interpretation through menu selections, etc. In any event, a filter menu 1204 allows the user to edit the search query interpretation displayed in search box 1202. In the embodiment depicted in FIG. 12, the focus is on the phrase "Email from" so a "KIND FILTER" menu 1204 is provided to the user. The menu 1204 provides various edit options to the user, such as adding other "kinds" of search objects besides email (e.g., contacts, tasks, documents, etc.), deleting email as a "kind" of search object for the current search, removing the filter and treating "email" as ordinary text (rather than a recognized keyword indicating the "kind" of search object). Additional details of the embodiment shown in FIG. 12 are described at 1208.

The embodiments of a user interface depicted in FIGS. 10-12 and described above are merely exemplary. There are a number of categories of filter menus, menu items and triggering events that may be utilized by those skilled in the art. For example, categories of menu items may include phrases, properties, named entities, MRU (Most Recently Used) property values, history, etc. In an embodiment, phrases and related properties are stored in a schema registry. MRU property values are typically checkbox-type items dynamically created over time and stored with user settings. Similarly, categories of menus may include empty query menu, mnemonic, named entity, plain key word, etc. Triggering events for displaying a filter menu may include user activation of a search box (with mouse or keyboard), user types a character, user pasted text (keyboard or menu), user moved text cursor using keyboard (arrows), user clicked in text, user selection (mouse or keyboard), etc.

Figure 13:
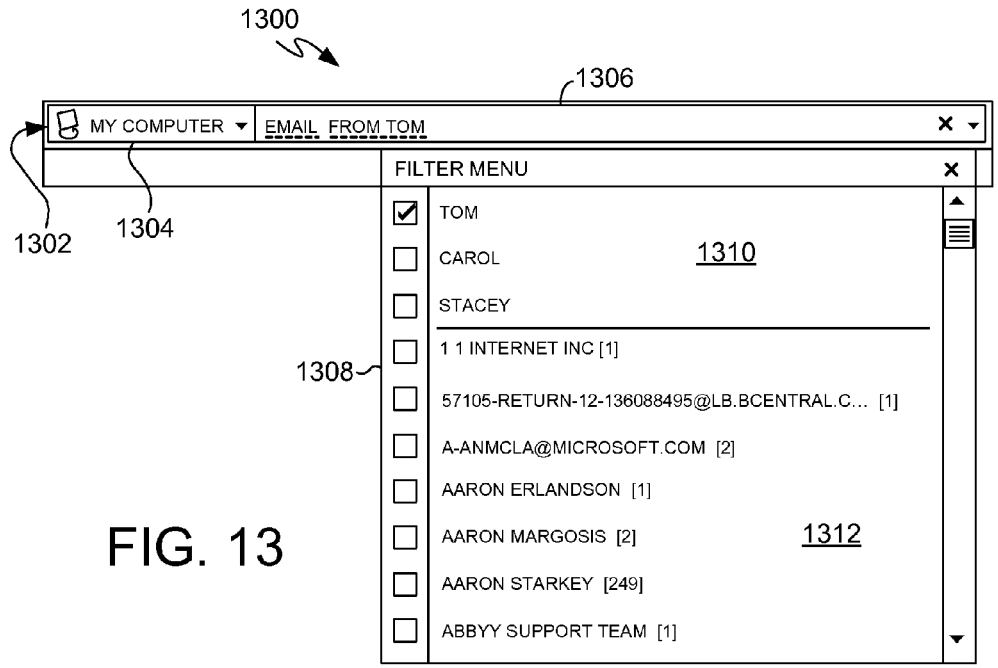
FIG. 13 is a partial screen depiction illustrating a user interface according to an embodiment of the present invention.

FIG. 13 is a partial screen depiction illustrating an embodiment of a user interface 1300. The interface 1300 includes a box 1302 comprising a breadcrumb bar 1304 indicating the user's path or location inline with a search box 1306. The interface 1300 also includes a filter menu 1308 having an upper area 1310 with checkboxes allowing the user to select or de-select a small subset of named entities (e.g., based on history) to add or delete from the search query interpretation displayed in the search box 1306. The menu 1308 also includes a lower area 1312 with checkboxes allowing the user to select or de-select from a more comprehensive list of named entities, including an associated numerical value for each entity indicating the number of items located in response to the search query interpretation currently displayed in the search box 1306. For example, the menu area 1312 immediately conveys to the user that one item associated with Aaron Erlandson would satisfy the currently displayed search query interpretation, compared to 249 items associated with Aaron Starkey that would satisfy the currently displayed interpretation.

In an embodiment, the filter menus 1004, 1104, 1204 and 1308 discussed above are context-aware and proactively provide values to the user. For example, these menus provide intelligent suggestions and recommendations to the user based on, for example, user history, auto-complete (e.g., word wheel), etc. In this regard, the filter menus of this embodiment may be implemented in a manner similar to the IntelliSense® technology in the Visual Studio® development system marketed by Microsoft Corporation of Redmond, Washington.

Figure 14:
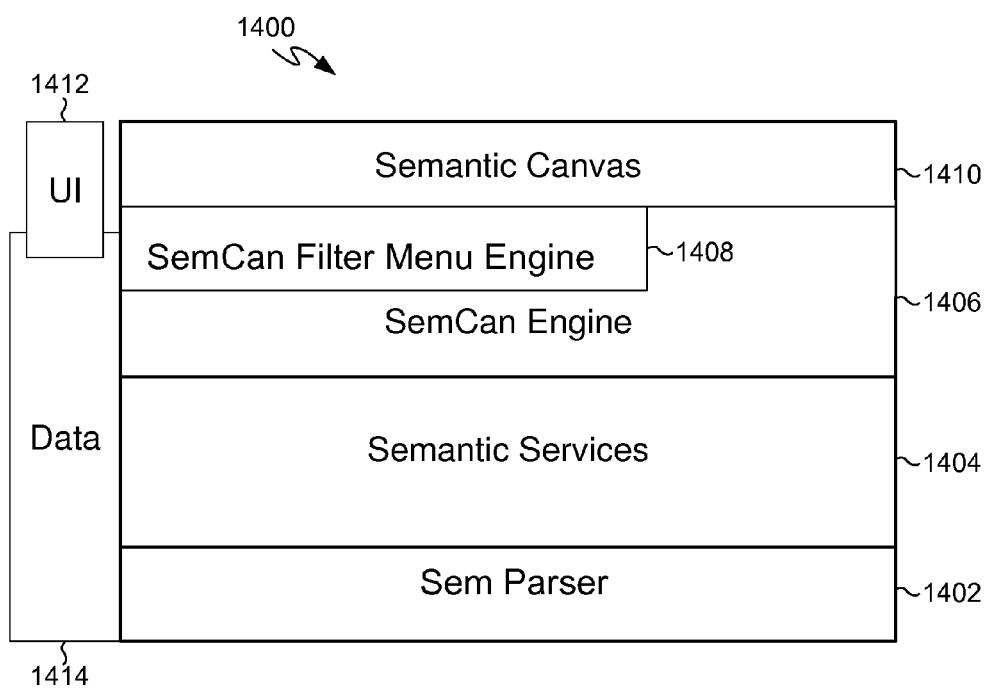
FIG. 14 is a simplified block diagram depicting an architectural overview of a system according to an embodiment of the present invention.

FIG. 14 is a block diagram depicting an architectural overview of a system 1400 according to one embodiment of the present invention. At the bottom level of the stack, a semantic parser 1402 designed to parse queries is provided. In one embodiment, the parser 1402 is optimized for SQL generation and form-based query building user interfaces. The parser 1402 can be adapted to support a text box-like user interface by providing an additional wrapping. Moving up the stack, semantic services 1404 provide schema management, parser management and resource management for the parser 1402. Semantic services 1404 also provide resource management for the MRU feature of the filter menus discussed above. Semantic services 1404 further include a property-values array, counts and values lookup, and query modification. A semantic canvas (or SemCan) engine 1406 creates query change objects for each change category. A semantic canvas filter menu engine 1408 analyzes the text caret position, determines which change categories to include in the filter menu and obtains the changes from the SemCan engine 1406. A semantic canvas 1410 converts natural language search inputs to search query interpretations and can be configured to reload on each key stroke or detected change to the currently displayed interpretation. The canvas 1410 provides indicia, such as custom underlining, coloring and dashing, and the canvas is configurable to hide or show the filter menus based on various flags (e.g., mouse, keyboard, activation). The system 1400 also includes a user interface 1412 and a data store 1414.

In one embodiment, the semantic parser 1402 is a Natural Language Processor (NLP) or restatement engine. NLP is a component which analyzes plain text and produces semantic tree interpretation of it. Analysis is metadata driven. Analysis metadata includes descriptions of entities to be recognized, such as properties (like Author, DateModified, BitRate, etc), kinds (like Email, Images, Documents), relative and absolute type values (like yesterday, last month, true, etc), etc. Each description includes unique system entity ID, its type, mnemonics, etc. Mnemonics are the key words and/or phrases which NLP treats as property identifiers in analyzed text. For example "from" and "sent by" are mnemonics for Message-.FromName property. NLP also recognizes dates, numbers, file names, URLs, etc. This type of recognition is not driven by any metadata but rather based on well known format specification, such as file name and path specifications, URL specifications, etc.

The following is an example of semantic interpretation:

```
METADATA:
  Property: Message.FromName; type: String; mnemonics:
    "from", "sent by", "fromname"
  Property: Message.FromAddress; type: String; mnemonics:
    "from", "sent by", "fromasddress"
  Property: Message.Subject; type: String; mnemonics:
    "subject", "about"
INPUT (plain text):
  from David subject (hello world)
OUTPUT (semantic tree):
  AND
  |-- OR
  |  |
  |  --- Property: Message.FromName (position in text 0-4)
  |  |    Value: David (position in text 5-10)
  |  |
  |  --- Property: Message.FromAddress (position in text 0-4)
  |       Value: David (position in text 5-10)
  |--AND
     |
     --- Property: Message.Subject (position in text 11-18)
     |    Value: hello (position in text 20-25)
     |
     --- Property: Message.Subject (position in text 11-18)
          Value: world (position in text 26-31)
```

Figure 15:
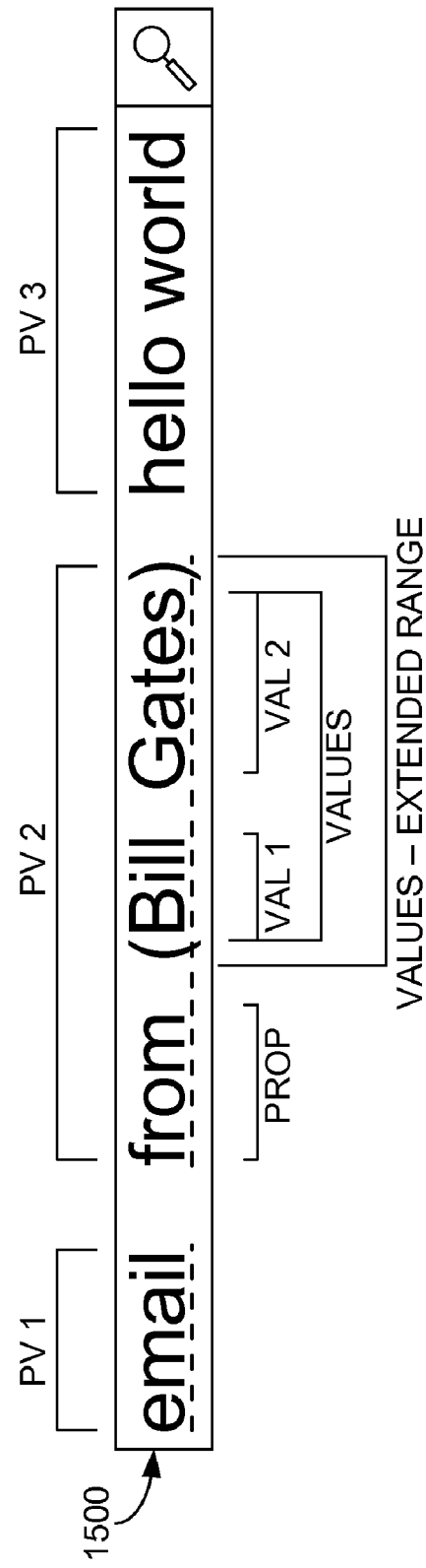
FIG. 15 is a depiction of a search box displaying a search query interpretation and indicating an exemplary parsing of the interpretation based on properties and values according to an embodiment of the present invention.

FIG. 15 is a depiction of one embodiment of a search box 1500 displaying a search query interpretation and indicating an exemplary parsing of the interpretation based on properties and values. Three property-values objects are shown in FIG. 15: PV 1, PV 2 and PV 3. In one embodiment, properties, such as "from" in FIG. 15, appear in blue text to a user and values, such as "Bill" in FIG. 15, appear in black text to a user. A property-values object has either one property or zero properties, and a property-values object can have from zero to many values. In FIG. 15, PV 2 has one property and two values that constitute a grouped value array. PV 3 has zero properties and an array of two values.

Figure 16:
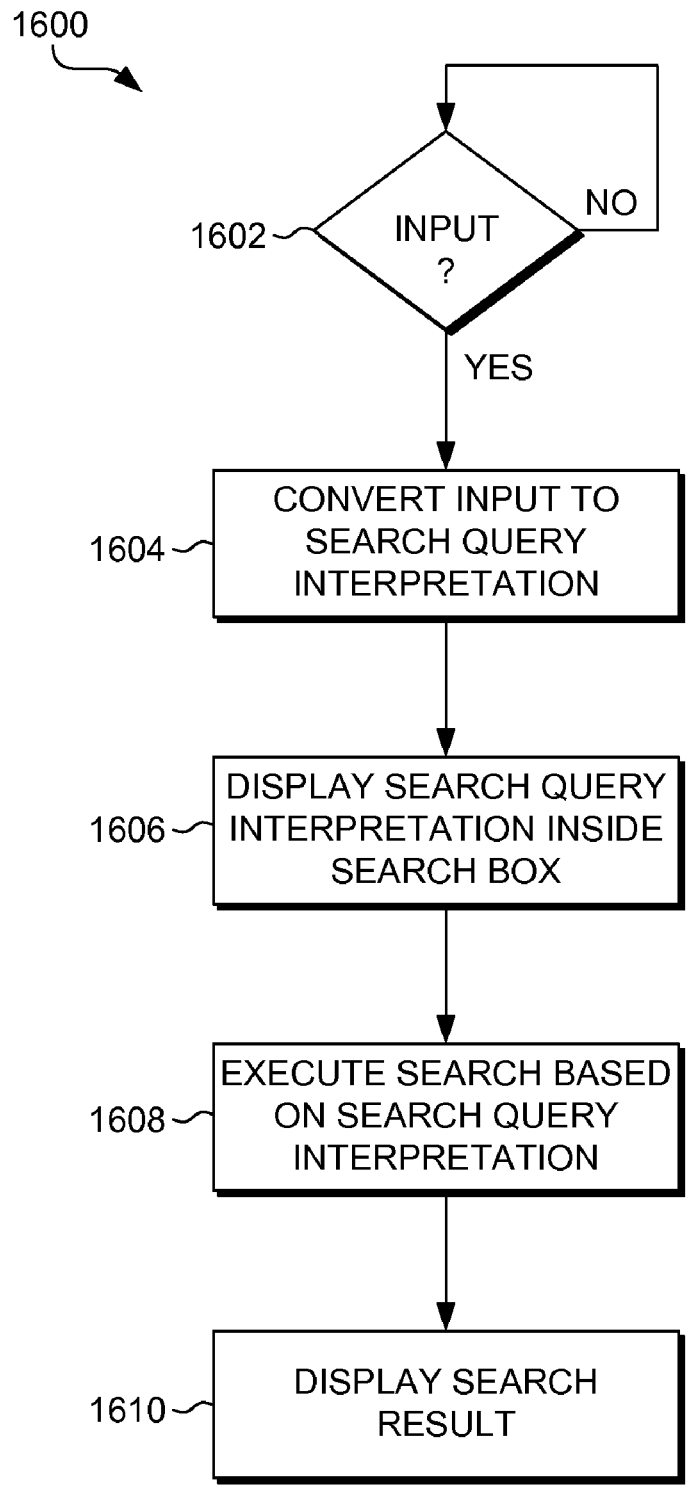
FIG. 16 is a flow diagram of an exemplary method according to an embodiment of the present invention.

FIG. 16 is a flow diagram of an exemplary method 1600 in accordance with one embodiment of the invention. The method 1600 begins at decision box 1602 at which it is determined whether or not a search query input (e.g., a natural language input) has been received. If so, the method converts the input to a search query interpretation at 1604. Next, the method displays the search query interpretation of the input inside a search box at 1606. Then, at 1608, the method executes a search process based on the search query interpretation. Finally, at 1610, search results are displayed to the user. Executing a search process and displaying search results upon each input or keystroke is optional. In one embodiment (e.g., a word wheel implementation) the search results display is refreshed each time the search query is modified. In an alternative embodiment (e.g., a web search engine implementation), search results may not be displayed until after a user builds a complete search query and clicks on a search button.

Although the present invention has been described with reference to particular embodiments, workers skilled in the art will recognize that changes may be made in form and detail without departing from the spirit and scope of the invention. Embodiments of the present invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

The invention claimed is:

1. One or more computer storage media having computer-executable instructions embodied thereon that, when executed, perform a method for transparently processing a search query, the method comprising:
   upon receiving a natural language text input from a user, converting the natural language text input to a search query interpretation of the natural language text input;
   displaying the search query interpretation to the user inside a search box;
   executing a search based on the search query interpretation and displaying a search result to the user; and
   upon receiving a user input modifying the search query interpretation displayed inside the search box, displaying the modified search query interpretation to the user inside the search box and executing a search based on the modified search query interpretation to provide a search result for display to the user.

2. The media of claim 1, wherein the search box is provided by at least one of a search engine, an application program, a web page, a web service and an operating system.

3. The media of claim 1, wherein the search query interpretation comprises text and indicia of at least one search query interpretation attribute.

4. The media of claim 3, wherein the search query interpretation attribute comprises one or more of a property, a value, a relationship and a filter.

5. The media of claim 1, wherein the user input modifying the search query interpretation comprises text.

6. The media of claim 1, wherein the user input modifying the interpretation comprises speech.

7. The media of claim 1, wherein the user input modifying the interpretation comprises a menu selection.

8. A method implemented on at least one computer having a processing unit and memory for transparently processing a search query, the method comprising:
   upon receiving a search query input from a user, wherein the search query input comprises text, converting the search query input to a search query interpretation of the search query input;
   displaying the search query interpretation to the user inside a search box;
   executing a search based on the search query interpretation and displaying a search result to the user; and
   upon receiving a user input modifying the search query interpretation displayed inside the search box, displaying the modified search query interpretation to the user inside the search box and executing a search based on the modified search query interpretation to provide a search result for display to the user.

9. The method of claim 8, wherein the search query interpretation comprises text and indicia of at least one search query interpretation attribute.

10. The method of claim 9, wherein the search query interpretation attribute comprises one or more of a property, a value, a relationship and a filter.

11. A synchronization system including a processor and memory for transparently processing a search query, the synchronization system comprising:
- a natural language (NL) input element configured to receive a NL search query input from a user;
- a search box configured to display a search query interpretation of the NL search query input to the user inside the search box;
- a graphical user interface (GUI) including one or more functional elements configured for user selection;
- a synchronization engine communicatively coupled with the NL input element and with the GUI and configured to monitor the NL input element for user inputs, to monitor the GUI for user selections, and to synchronize the NL input element and the GUI in response to user inputs and user selections;
- a restatement engine communicatively coupled with the synchronization engine and configured to convert selected functional elements of the GUI to NL text input in the NL input element;
- a semantic engine communicatively coupled with the synchronization engine and configured to convert the NL search query input received at the NL input element to functional elements in the GUI; and
- an execution engine communicatively coupled with the synchronization engine and configured to execute a search based on the search query interpretation and provide a search result for display to the user.

12. The system of claim 11, wherein the NL input element is further configured to receive a user input modifying the search query interpretation displayed inside the search box; wherein the search box is further configured to display the modified search query interpretation to the user inside the search box; and wherein the execution engine is further configured to execute a search based on the modified search query interpretation and provide a search result for display to the user.

* * * * *